No. 837,786. PATENTED DEC. 4, 1906.
W. BRANCH.
CORN CRIB.
APPLICATION FILED SEPT. 1, 1905.
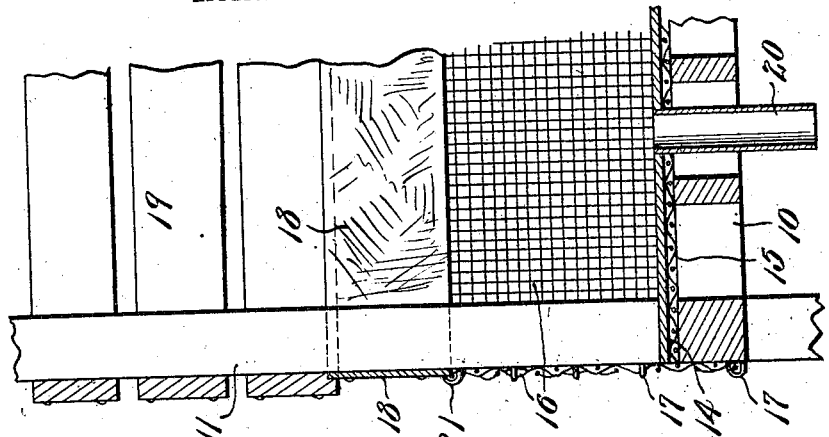
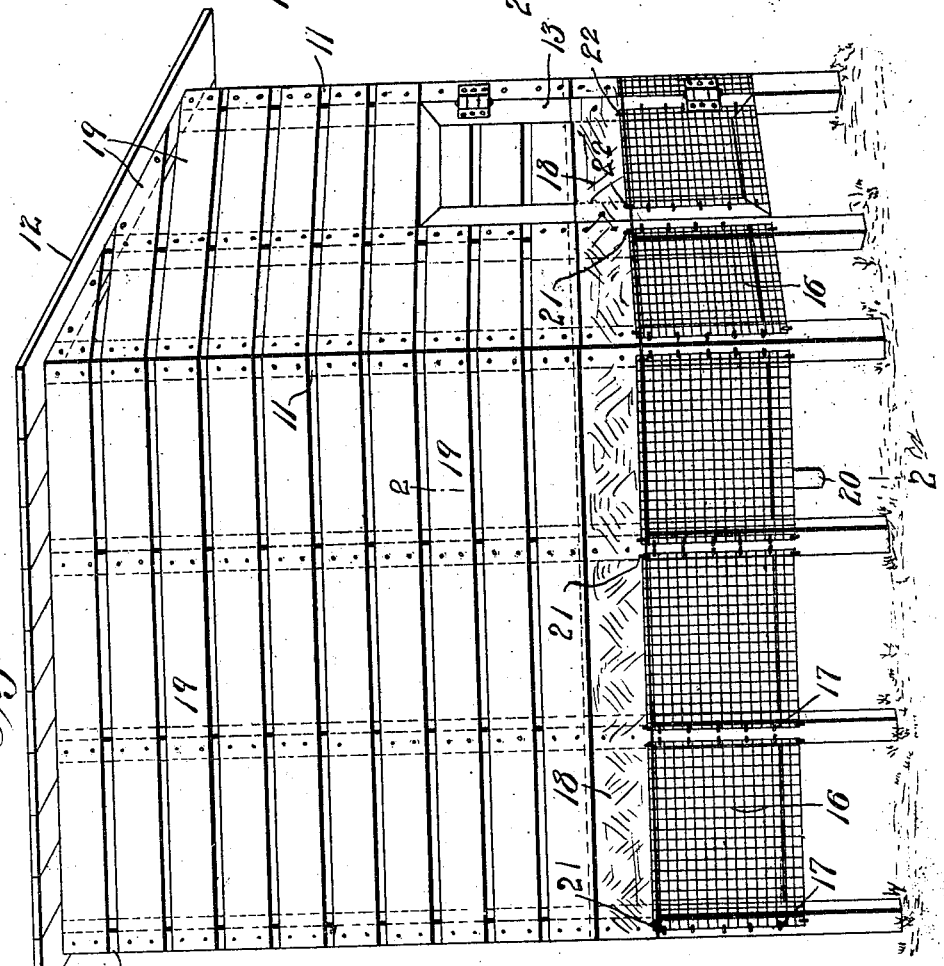
Witnesses
E. K. Stewart,
C. N. Woodward
William Branch, Inventor.
by C. A. Snow & Co.
Attorneys

UNITED STATES PATENT OFFICE.

WILLIAM BRANCH, OF ABINGDON, ILLINOIS.

CORN-CRIB.

No. 837,786.  Specification of Letters Patent.  Patented Dec. 4, 1906.

Application filed September 1, 1905. Serial No. 276,756.

*To all whom it may concern:*

Be it known that I, WILLIAM BRANCH, a citizen of the United States, residing at Abingdon, in the county of Knox and State of Illinois, have invented a new and useful Corn-Crib, of which the following is a specification.

This invention relates to structures for the storage of corn and for similar purposes, and has for its object to produce a simply-constructed receptacle of this character which will effectually protect the contents from rats and other like animals.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a perspective view of the improved structure. Fig. 2 is a sectional detail, on an enlarged scale, illustrating the construction more fully, on the line 2 2 of Fig. 1.

The improved structure may be any size or of any capacity, and comprises a floor-frame 10, spaced vertical side members 11, roof 12, and preferably with an inlet-door 13. The floor-frame 10 is spaced above the ground, (indicated at 21,) and the floor 14 bears upon the floor-frame. The floor is protected by a shield 15, of material capable of repelling animals, more particularly rats and other similar animals, the shield being preferably of wire-netting or other foraminous or reticulated material and disposed between the floor and the supporting-joist, as shown in Fig. 2. Extending around the vertical members 11 at their lower portions is a band 16 of wire-cloth or other suitable foraminous material in sections, the foraminous band extending at the lower edge below the protecting-shield 15 and closely engaging the edges of the same, so that animals cannot pass between the two members. Extending around the vertical members 11 above the foraminous band 16 is an imperforate band 18 of sheet metal, the upper edge of the foraminous band overlapping the lower edge of the imperforate band. The vertical members 11 above the band 18 are provided with spaced horizontal slats 19, preferably of wood, the lower belt of slats overlapping the upper edge of the band 18, as shown, and thus securing it firmly in position. The lower inner corners of the lower belt of slats 19 are rabbeted, as shown at 21 in Fig. 2, to assist in holding the sheet-metal band in position. The foraminous band 16 is formed in sections corresponding in length to the spaces between the vertical members 11 and secured by staples 17 or other easily-detachable means, so that one or more of the sections may be readily detached, if required. One of the foraminous sections 16 and a section of the sheet-metal band 18 are also attached to the door 13, and slats corresponding to the slats 19 are also disposed upon the door-frame, as shown in Fig. 1, so that the door structure conforms to the side and end walls of the remainder of the structure. By this means if a rat or like animal attempts to pass over the lower or foraminous band he will be repelled by the smooth surface of the sheet-metal band. The lower foraminous band thus effectually prevents the entrance of all animals, while at the same time providing ample ventilation for the contents of the structure.

At one or more points in the floor 13 a relatively small depending metal tube 20 is disposed to afford means for the escape of any rats which may get into the structure through the door 13 when inadvertently left open. Rats and like animals can very readily escape through the tubular member 20, but could not return by the same means, as will be obvious.

As is well known, rats and like animals must reach water at regular intervals, and if one or more should get into the structure through the door 13 or other aperture inadvertently left open they will seek to escape when water is required, and they can readily do so through the escape-tube 20 or by climbing the members 11 and passing between the slats 19 and jumping to the ground; but they cannot pass back again to the interior of the structure.

The device is simple in construction, can be inexpensively manufactured, and of any required size or capacity.

Having thus described the invention, what is claimed is—

The combination with a structure including a floor spaced from the ground, a roof, and side walls of spaced horizontal members, of a foraminous shield beneath said floor and extending to the edges of the same, a band of foraminous material bearing upon the sides of the structure and extending at the lower portion below said floor-shield and bearing against the edges of the same, a band of imperforate metal bearing upon the sides of the structure with its lower edge overlapped by the upper edge of the foraminous band, and a metal tube extending through said floor and its shield with its lower terminal spaced from the ground beneath the structure.

In testimony that I claim the foregoing as my own I have hereto affixed my signature in the presence of two witnesses.

WILLIAM BRANCH.

Witnesses:
    A. E. WERTS,
    J. H. SIMMONS.